Patented June 27, 1950

2,513,133

UNITED STATES PATENT OFFICE 2,513,133

SATURATED DIHYDRIC ALCOHOLS AND PROCESS FOR THE PREPARATION THEREOF

Lewis F. Hatch, Austin, Tex., and Theodore W. Evans, Oakland, Calif., assignors to Shell Development Company, San Francisco, Calif., a corporation of Delaware No Drawing. Application February 24, 1947, Serial No. 730,546

10 Claims. (Cl. 260—333)

This invention relates to dihydric heterocyclic alcohols and to a method for their preparation. More particularly, the invention relates to dihydric alcohols in the tetrahydropyran series of compounds and to a process for their preparation from acrolein and related unsaturated aldehydes.

A further aspect of the present invention comprises the preparation of esters of the dihydric alcohols, as represented, for example, by the esters thereof with lower carboxylic acids or by the esters with polycarboxylic acids, such as those that may be employed in the preparation of alkyd resins and similar products of esterification reaction.

The dihydric alcohols provided by the process of the present invention are cyclic in character. The exact structure depends upon the aldehyde used for their preparation. The dihydric alcohols formed by the process of the invention possess in common the characteristics of containing a saturated pyran ring, i. e. a tetrahydropyran ring, and of having one hydroxyl group attached directly to the tetrahydropyran ring and the second hydroxyl group present in a hydroxymethyl group that is directly bonded to the tetrahydropyran ring. They may be described generally as 4 - hydroxy - 3 - hydroxymethyl - tetrahydropyrans, and as having structures corresponding to the apparent structural formula:

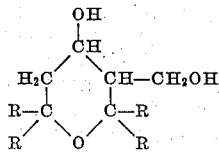

wherein the R's represent the same or different members of the class consisting of hydrogen and hydrocarbyl radicals.

These dihydric alcohols contain, unlike the terminally substituted aliphatic glycols, two hydroxyl groups of substantially dissimilar character. For example, complete esterification of the present dihydric alcohols with acetic anhydride or other suitable esterifying agents is accomplished only under quite rigorous conditions of esterification. On the other hand, partial esterification, i. e., esterification of only one of the two hydroxyl groups is effected with relative ease. Because of this particular characteristic, the present dihydric alcohols are highly adaptable to use in the preparation of mixed esters which contain residues of different esterifying acids in predetermined proportions, or to the preparation of products of partial esterification wherein only one of the two hydroxyl groups is esterified.

In accordance with the process of the present invention, the dihydric alcohols thus characterized are prepared by reacting with water, an alpha,beta-unsaturated aldehyde such as acrolein having a hydrogen atom attached to the carbon atom in the alpha position, and subsequently hydrogenating the product of hydration reaction under conditions that favor retention in the molecule of the elements of water combined during the initial step of the process. The formation of the cyclic dihydric alcohols apparently involves a combination of hydration, cyclization, and hydrogenation reactions caused to take place by and during the procedural steps of the process. By means of these reactions and their combination, the process of the present invention accomplishes as one of its primary objectives the conversion of unsaturated aldehydes of the herein defined class to heterocyclic dihydric alcohols which have commercial value in a wide field of utility.

The process of the present invention is broadly applicable to the conversion of alpha,beta-unsaturated aldehydes to dihydric alcohols. A preferred class of aldehydes to which the present process may be applied may be characterized as containing the structural unit:

the free valencies of the beta carbon atom being satisfied by either hydrogen or by a hydrocarbyl radical such as an alkyl, cycloalkyl, alkenyl, cycloalkenyl, aryl, alkaryl, aralkyl, or alicyclic radical, i. e., methyl, ethyl, propyl, isopropyl, the butyls, the pentyls, etc., phenyl, tolyl, xylyl, benzyl, etc., cyclohexyl, etc., and analogous and homologous specific radicals of the general stated types. It is preferred to employ those unsaturated aldehydes of the present class which contain not more than one carbon-to-carbon multiple bond, that is, those aldehydes of the present class wherein the substituent groups, if any, attached to the beta carbon atom are saturated hydrocarbyl groups. The process of the present invention is particularly suited to conversion of alpha,beta-unsaturated aldehydes having attached to the beta carbon atom either hydrogen or up to two separate alkyl groups containing not more than six carbon atoms, i. e., to conversion of acrolein and substituted acroleins having up to two lower alkyl groups attached to the beta carbon atom only. Particularly advantageous results are obtained in the present process when acrolein is employed as the alpha,beta-unsaturated aldehyde.

If desired, mixtures of more than one of the above unsaturated aldehydes may be employed. Also, the organic radicals, if any, attached to the beta carbon atom in the above structural formula may, if desired, be further substituted with groups such as amino, hydroxy, halide, etc., provided such groups are in a position and of a character not to interfere with or to prevent successful practice of the process of the invention.

The alpha,beta-unsaturated aldehydes which may be employed in accordance with the present process possess in common the highly reactive carbonyl group and the olefinic bond conjugate thereto, with a highly reactive hydrogen atom attached to the alpha carbon atom. Such compounds are well noted for their ease of polymerization, and also for their tendency, when hydrated as by addition of water to the olefinic bond, to lose the elements of water and hence revert to the original unsaturated form. This latter tendency is particularly notable in the presence of active dehydration catalysts.

The process of the present invention, however, is dependent upon a combination of hydration, cyclization, and hydrogenation reaction to provide saturated cyclic alcohols without loss of the elements of water from the reactant molecules so as to form unsaturated products and without substantial polymerization. In accordance with the present invention, it has been found that such possible dehydration of the hydration products of the alpha,beta-unsaturated aldehydes of the present class may be substantially minimized. It also has been found that the amount of polymerization taking place in conjunction with the hydration, cyclization, and hydrogenation of the present aldehydes may be retained within reasonable limits. As one feature of the present invention, it has been discovered that saturated cyclic dihydric alcohols may be obtained by a process comprising hydration of alpha,beta-unsaturated aldehydes, preferably in the presence of an acidic hydration catalyst. This is quite unexpected, because acidic agents are frequently employed in the dehydration of hydroxy aldehydes (i. e., hydrated unsaturated aldehydes) and it therefore would be expected that such acidic agents would enhance the formation of unsaturated products or would lead to conditions promoting excessive polymerization of the aldehyde reactant or of intermediate products.

The first step in the process of the present invention involves reacting an unsaturated aldehyde of the herein defined class with water, preferably in the presence of an acidic hydration catalyst which may be any substance which produces hydrogen ions in an aqueous medium. Preferably, the reaction is effected in a strongly acid medium, rendering the use of strongly acidic hydration catalysts desirable. Suitable acidic substances are, for example, acid salts, inorganic acids, organic acids, and the like. Acidic substances adapted to impart to an aqueous medium a pH below about 2.5 are particularly suitable, among these latter being, for example, the strong mineral acids sulfuric acid, hydrochloric acid, phosphoric acid, certain organic acids such as trichloracetic acid, sulfonic acids, and others. Other acidic hydration catalysts which may be employed include, for example, oxalic acid, tartaric acid, sodium acid sulfate, sodium dihydrogen phosphate, perchloric acid, and similarly acidic materials.

The concentration of acidic hydration catalyst to be employed in the aqueous medium depends upon the particular acidic material as well as upon other considerations. An amount of acidic hydration catalyst sufficient to impart to the aqueous medium a pH of from 0.5 to 7.0 generally may be employed. In the case of conversion of acrolein to a heterocyclic saturated dihydric alcohol, for example, particularly satisfactory results have been obtained by reaction in an aqueous medium to which a pH of from about 0.5 to about 2.5 has been imparted by the presence of acidic hydration catalyst. The necessary concentration of acidic hydration catalyst in the aqueous medium depends, other conditions being equal, upon the acidic strength of the catalyst; for any given acidity, or pH, smaller amounts of strongly acid materials and larger amounts of weakly acidic hydration catalysts are required.

When strong mineral acids are employed as the hydration catalyst, acid concentrations in the aqueous medium of less than about 1 normal have been found effective, normalities of from about 0.001 normal to about 1.0 normal generally being preferable. For example, at a hydration temperature of about 20° C. to about 30° C., highly satisfactory results have been obtained in the presence of sulfuric acid at a concentration in the aqueous medium of from about 0.1 normal to about 1.0 normal. At higher temperatures, say 75° C. to 100° C., aqueous media containing correspondingly lower concentrations of acidic catalyst have been employed satisfactorily.

The temperature of reaction in the first step of the present process may, in general, be varied relatively widely, say from about 20° C. to about 130° C. Lower temperatures, in the order of from about room temperature up to about 50° C., have been found to provide particularly good yields of products convertible by hydrogenation to saturated heterocyclic dihydric alcohols of the herein described class, when an acid catalyst such as sulfuric acid is present in concentrations imparting to the aqueous medium a pH of from about 0.5 to about 2.5. The use of higher reaction temperatures or of longer reaction times enables the use of lower concentrations of the acidic catalyst. Highly satisfactory yields in the overall process of the present invention also are favored by relatively high concentrations of unsaturated aldehyde in the aqueous medium during the first step of the process. Concentrations of unsaturated aldehyde of from about 5 per cent to about 30 per cent based on the amount of aqueous medium may be employed, particularly satisfactory results being obtainable at concentrations of unsaturated aldehyde of from about 15 per cent to about 30 per cent based on the amount of aqueous medium.

Prolonged reaction times are not necessary in the hydration step of the present process. Satisfactory results in the overall process generally may be obtained when the reaction time in the initial step does not exceed 24 hours or so, although longer reaction time may be employed if desired.

Effective yields of a saturated heterocyclic dihydric alcohol of the present novel class have been obtained from acrolein, for example, by effecting the first step of the process by reacting about 50 parts of acrolein with water present in an amount from about 500 to about 1500 parts of water and containing about 0.1 to about 1.0 equivalent of sulfuric acid per liter, at temperatures of from about 20° C. to about 35° C., and for periods of time of from about 2 hours to about 15 hours.

A polymerization inhibitor or anti-oxidant, for example, a phenolic compound such as hydroquinone, may, if desired, be included in the aqueous reaction mixture to stabilize the unsaturated aldehyde and/or intermediate products against undesired side reactions, excessive condensation reactions, etc. When unsaturated aldehydes having only slight solubility or miscibility with the aqueous medium, are employed, a homogenizing medium such as a mutual solvent for the aldehyde and the aqueous medium may be included. Dioxane and other inert solvent media which do not interfere with the course of the reaction may be employed as the solvent medium.

Reaction between the aqueous medium and the unsaturated aldehyde may be effected in any way desired. In the case of aldehydes such as acrolein that are relatively soluble in the aqueous medium, dispersion of the aldehyde in the aqueous medium under the stated conditions of temperature, quantities, time and the like, ordinarily suffices. Stirring or agitation may be employed to obtain more intimate mixture if desired. The hydration reaction may be effected either batchwise, intermittently or continuously.

After completion of the hydration step of the process, the acidic catalyst desirably is removed from the reaction mixture or neutralized by any suitable means. Sufficiently volatile catalysts may, if desired, be either partly or wholly removed as by partial distillation of the reaction mixture. Alkalies, or alkaline salts may be added to the reaction mixture to neutralize the acid catalyst either in whole or in part. However, because of the known sensitivity of unsaturated aldehydes toward alkalies, careful and controlled addition of such alkalies may be necessary to avoid undue reaction such as the Michael polycondensation, etc. A particularly suitable method of removing the acid catalyst is to add to the mixture a salt comprising an anion of a weak, preferably volatile, acid and a metal cation capable of forming an insoluble salt with the acid catalyst (e. g., barium carbonate or silver carbonate to remove sulfuric acid or hydrochloric acid, respectively), the insoluble salt thereby formed being removed as by filtration.

The product of the hydration treatment may, if desired, be separated into two or more fractions by any suitable means. Alternatively, the entire product of the hydration step of the process may be subjected to the hydrogenation treatment. Preferably, however, the product of the hydration step of the process is separated into an aqueous fraction and a substantially non-aqueous fraction prior to hydrogenation, the substantially non-aqueous fraction being subjected to the hydrogenation treatment. The aqueous fraction may be removed, for example, by subjecting the crude product of hydration reaction to distillation up to temperatures of about 30° C. under about 10 to 15 mm. mercury pressure or less, the non-aqueous fraction remaining in the still kettle, or by other suitable means. Higher or lower distillation temperatures may be used, depending upon the preparation of the product to be separated. It has been found that the removal of water and possibly other lower boiling materials from the crude product of hydration reaction provides higher yields of the desired heterocyclic dihydric alcohols, possibly by eliminating material in the crude mixture which otherwise tends to promote excessive side reactions during the hydrogenation treatment.

Hydrogenation of the product of the hydration step of the process is effected by contacting the entire hydration mixture, or the non-aqueous part thereof if fractionated in accordance with the foregoing, with hydrogen in the presence of a suitably active hydrogenation catalyst. If the crude product is employed in its entirety, the catalyst may be suspended therein or otherwise contacted therewith, and the whole subjected to the action of hydrogen. In a preferred embodiment of the invention, the substantially non-aqueous fraction of the product is separated as described above and dissolved or dispersed in an inert organic solvent medium such as a lower aliphatic alcohol, an aliphatic hydrocarbon, a chlorinated hydrocarbon, an aromatic hydrocarbon, an ether, an ester, etc., or mixtures thereof. Isopropyl alcohol, diethyl ether, and the like are highly satisfactory for use as the solvent medium. From 1 part of organic solvent medium up to 50 parts or more per part of hydration product may be employed.

Any of the hydrogenation catalysts known to the art may be used with varying degrees of effectiveness in the hydrogenation step of the present process. Of those which are especially adapted to use in accordance with the present invention, the catalysts known to the art as Raney's nickel and Adkins' copper-chromium oxide catalyst are very efficacious from the standpoint of both cost of efficiency. Other suitable hydrogenation catalysts are those consisting of or comprising one or more metals, or catalytically active compounds of metals, such as Fe, Co, Cu, Pd, Zr, Ti, Th, V, Pt, Ta, Ag, Mo, Al, and the like.

In a preferred case, e. g., when Raney nickel is employed as the hydrogenation catalyst in an amount from about 2 per cent to about 10 per cent of the product to be hydrogenated, the hydrogenation may be effected satisfactorily at temperatures of from about 30° C. to about 200° C. and under hydrogen pressures of from about 500 to about 5000 pounds or more per square inch. When other catalysts are employed, conditions leading to an equivalent degree of hydrogenation should be provided. It has been found that unless the hydrogenation is effected under relatively rigorous conditions of hydrogenation, reduced yields of the desired dihydric cyclic alcohols may result and/or substantial amounts of carbonylic materials may remain in the crude products of hydrogenation. For most effective results the hydrogenation treatment may be effected in the presence of about 5 per cent by weight of Raney nickel catalyst at a temperature of from about 90° C. to about 200° C. at a hydrogen pressure in excess of about 1000 pounds per square inch, or under equivalent conditions. Hydrogenation times of from 0.5 to 8 hours or more may be used effectively. In the case of hydration products of acrolein, for example, hydrogenation of a substantially non-aqueous fraction of the hydration product dissolved in isopropyl alcohol and in the presence of Raney nickel catalyst, at a temperature of about 110° C. to about 150° C. and under a hydrogen pressure of about 1500 pounds per square inch for about 8 hours has been found to provide particularly effective yields of a 4-hydroxy-3-hydroxymethyltetrahydropyran. At the conclusion of the hydrogenation, the mixture may be separated from the catalyst as by filtration and any traces of catalyst that may have dissolved, may be removed by suitable means, such as chemical precipitation, adsorption, etc.

At the conclusion of the hydrogenation treatment, the heterocyclic dihydric alcohol formed as a result of the present process may be recovered from the crude product of hydrogenation by any suitable means, fractional distillation under reduced pressure generally being preferred. The heterocyclic dihydric alcohols generally are high boiling products, and ordinarily are among the last distillable products to be distilled from the crude hydrogenation product. As an alternative mode of recovery, the crude hydrogenation product may be treated with an esterifying agent adapted to convert the heterocyclic alcohols therein to esters and the ester recovered, for example, by fractional distillation. The free alcohols then may be recovered, if desired, by suitable conversion treatment leading to hydrolysis of the ester thus isolated.

When acrolein is employed as the unsaturated aldehyde in the process of the invention, there may be obtained in good yields the cyclic dihydric alcohol 4-hydroxy-3-hydroxymethyltetrahydropyran. (This compound alternatively may be referred to as tetrahydropyran-4-ol-3-methanol in accordance with the rules of nomenclature of organic compounds followed in Chemical Abstracts and described in Chemical Abstracts, volume 39, introduction to the subject index, December 20, 1945.) It has a structure corresponding to the structural formula

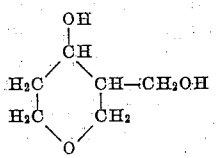

Because of its chemical structure, and its chemical and physical properties, this compound possesses particularly desirable attributes that render it useful in numerous applications. Other 4-hydroxy - 3 - hydroxymethyltetrahydropyrans which may be prepared according to the process of the present invention include, for example, 4-hydroxy-3-hydroxymethyl -2,6- dimethyltetrahydropyran obtainable from crotonaldehyde, 4-hydroxy-3-hydroxymethyl-2,6-diethyltetrahydropyran obtainable from beta-ethylacrolein, 4-hydroxy-3-hydroxymethyl - 2,2,6,6 - tetramethyltetrahydropyran obtainable from beta,beta-dimethylacrolein, and the like.

These and related dihydric alcohols provided by the process of the present invention are of utility in a variety of valuable applications. They may be used advantageously as solvents, plasticizers, blending agents, tackifiers, and the like in a wide variety of compositions. They thus find valuable application as textile assistants or as solvents in special surface coating compositions, as plasticizers in compositions comprising cellulose or cellulose derivatives, in resinous compositions, and the like.

A particular field of utility of the 4-hydroxy-3-hydroxymethyltetrahydropyrans has been found to reside in their conversion to useful esters, as their esters with monocarboxylic acids or polycarboxylic acids. Mono- or di-esters of the dihydric alcohols with monocarboxylic acids may be prepared advantageously by reaction of the alcohol with the free acid under suitable esterifying conditions or by reaction with a suitable derivative of the acid, such as an acid anhydride, an acid halide, etc. The esters of the present dihydric alcohols with lower unsaturated fatty acids, such as acrylic acid, methacrylic acid, crotonic acid, vinylacrylic acid, propargylic acid, alpha-chloroacrylic acid, alpha,beta-dichlorocrotonic acid, and similar unsaturated acids are of value as raw materials for the preparation of improved products of polymerization reaction. Mild conditions of reaction tend in general to produce esters in which only one of the two hydroxyl groups is esterified. More forceful conditions of esterification promote, in general, esterification of both of the hydroxyl groups.

Valuable ester products may be prepared in accordance with the present invention by esterification of the herein described dihydric alcohols with higher monocarboxylic acids, particularly the non-drying aliphatic monocarboxylic acids containing from 12 to 20 carbon atoms, monocarboxylic resin acids, and the like, examples of such acids being stearic acid, palmitic acid, oleic acid, ricinoleic acid, myristic acid, arachidic acid, lauric acid, copal resin acids, rosin acids, modified rosin acids, and the like. The non-drying esters that thereby are obtained are of particular value as lubricants in resinous molding compositions, as plasticizers, as softening agents, and as similar ingredients in various useful compositions. The esterification may be effected in any manner known to the art, for example, by direct reaction of the free acid or a suitable derivative thereof with the dihydric alcohol in either a relatively impure form as may be obtained directly by the herein described hydrogenation process, or in a more highly purified state. If desired, the esters may be prepared, for example, by ester-interchange reaction with glyceride esters of the foregoing or other carboxylic acids, whereby mixtures of the present novel esters with glyceride esters are obtained.

In place of the non-drying acids referred to above, there may be employed higher unsaturated aliphatic acids containing at least 16 carbon atoms and having an iodine number (Wijs) of at least 120, and known to the art as drying oil acids. Examples of such acids are lauroleic, linoleic, arachidonic, clupanodonic, eleostearic, and similar acids.

By employing dicarboxylic acids in place of monocarboxylic acids referred to above, valuable high molecular weight non-heat convertible esters of the alkyd resin type may be prepared from the present dihydric alcohols. Suitable dicarboxylic acids are, for example, oxalic acid, succinic acid, maleic acid, glutaric acid, phthalic acid or phthalic anhydride, adipic acid, pimelic acid, sebacic acid, diglycolic acid, diphenic acid and analogous and homologous dicarboxylic acids. The esters may be produced by direct esterification of the alcohol with an acid or, in appropriate cases, the anhydride of the acid, or by other known or special methods. Catalysts known to be effective in promoting esterification reaction may in general be employed if desired. The properties of the high molecular weight esters thus prepared depend in part upon the particular dicarboxylic acid employed as well as upon the extent of esterification reaction, etc. By suitable selection of reactants and reaction conditions, there may be prepared polyesters of the present type ranging from viscous liquids to soft solids and, in some cases, relatively brittle solids. Wax-like to high-melting plastic products may be prepared. The non-heat convertible alkyd type esters thus obtainable may be used, for example, as heat-resisting plasticizers, as ingredients of coating compositions, as lubricants and the like, as modifiers for textiles and fabrics, and in similar applications.

Heat convertible alkyd resins may be prepared using the present dihydric alcohols either alone or in conjunction with other polyhydric alcohols by reaction of the same with suitable polycarboxylic acids containing three or more carboxyl groups. Representative acids containing three or more carboxyl groups are, for example, tricarballyic acid, citric acid, aconitic acid and homologous and analogous acids. The present dihydric alcohols also constitute valuable modifiers to be included in alkyd resins of types well known to the art and prepared by reaction of glycerol or other alcohols containing more than two hydroxyl groups, with polycarboxylic acids.

The following examples will serve to illustrate certain specific embodiments of the present invention without, however, limiting its scope other than as it is defined by the appended claims.

Example I 1250 parts of acrolein and 6000 parts of N/1 aqueous sulfuric acid solution were mixed and stirred together for two hours at about 30° C. The resultant hydration mixture was neutralized by the addition of solid calcium carbonate and suspended solids were removed by filtration. The water and other low boiling materials were separated from the filtrate by distillation at about 20° C. and under a pressure of less than 10 mm. of mercury. The residue was dissolved in acetone and freed of traces of residual solids by filtration and the acetone was removed by distillation.

200 parts of the substantially non-aqueous material thus obtained were dissolved in two volumes of ethanol and hydrogenated by treatment with hydrogen at a temperature of 100° C. to 150° C. and a pressure of 1000 pounds per square inch in the presence of Raney nickel hydrogenation catalyst until adsorption of hydrogen was complete. The catalyst was removed by filtration and the solvent was removed by distillation. 194 parts of the crude product of hydrogenation thus obtained were treated with 495 parts of acetic anhydride in the presence of 495 parts of pyridine, the anhydride, dissolved in the pyridine, being added slowly to the product of hydrogenation and the resultant mixture being allowed to stand at 35° C. for six hours. The thus treated material was fractionated by distillation under reduced pressure and the portion distilling at 75° C.–79° C. under a pressure of about 0.2 mm. mercury was separated and identified as the diacetate of 4-hydroxy-3-hydroxymethyltetrahydropyran. The diacetate was additionally characterized as having a refractive index ($n_D^{20}$) of 1.4508 and a density ($d_4^{20}$) of about 1.133.

Saponification of the diacetate provided the dihydric alcohol, 4-hydroxy-3-hydroxymethyltetrahydropyran, which was characterized by a boiling point of about 86° C. under a pressure of 0.1 mm. mercury, a refractive index ($n_D^{20}$) of 1.4858 and a density ($d_4^{20}$) of about 1.18.

Example II

Crude hydration product, prepared as in Example I, was dissolved in an equal weight of isopropyl alcohol and hydrogenated by treatment with hydrogen at 150° C. and 1500 pounds per square inch in the presence of Raney nickel hydrogenation catalyst. When the hydrogenation was completed, solvent and lower boiling materials were removed by distillation, leaving a viscous slightly yellow residue. The residue was subjected to fractional distillation and 4-hydroxy-3-hydroxymethyltetrahydropyran was recovered at a distillation temperature of about 125° C. under a pressure of about 1 mm. mercury. Of the material in the crude product of hydrogenation boiling above about 60° C. under 1 mm. mercury pressure, approximately 23% was recovered as 4-hydroxy-3-hydroxymethyltetrahydropyran.

Example III

A mixture of 300 parts of acrolein and 232 parts of water, containing 0.5 weight per cent sulfuric acid and 1 per cent hydroquinone, was heated for 8 hours at 70° C. to 80° C.; 89 per cent of the acrolein was found to have reacted. The resultant mixture was treated with hydrogen in the presence of Raney nickel catalyst, at a temperature of 80° C. to 100° C. and at a hydrogen pressure of about 1000 pounds per square inch, for a period of about 12 hours. Upon distillation of the resultant mixture, 4-hydroxy-3-hydroxymethyltetrahydropyran was recovered in a yield, based upon the acrolein reacted, of 21.4%.

The crude hydration mixture prepared as hereinbefore described and as illustrated in the foregoing examples, is a complex mixture of products resulting from the hydration of the unsaturated aldehyde and possible side reactions and the like. The examples show that an important product of the hydrogenation of the crude mixtures is the cyclic dihydric alcohol of the hereindefined class. Other products which have been found to be formed by hydrogenation of the mixture of hydration products include, for example, the saturated aliphatic alcohol formed by hydrogenation of any unreacted unsaturated aldehyde that may be present, such as n-propyl alcohol formed by the hydrogenation of unreacted acrolein; aliphatic, dihydric alcohols formed apparently by hydrogenation of non-cyclic hydration products of the unsaturated aldehyde, e. g., trimethyleneglycol when acrolein is employed as the unsaturated aldehyde; and also products of higher molecular weight and of unknown composition, apparently resulting from the hydrogenation of small amounts of higher condensation products of the unsaturated aldehyde. It will be apparent that these additional materials may be separated if desired, from the reaction mixture after the hydrogenation step of the process, by any suitable means such as fractional distillation or the like.

This application is a continuation-in-part of our copending application Serial No. 456,124 filed August 24, 1942, now Patent No. 2,434,110, issued January 6, 1948.

We claim as our invention:

1. As a new chemical compound, 4-hydroxy-3-hydroxymethyltetrahydropyran.

2. A method of preparing saturated dihydric alcohols including 4-hydroxy-3-hydroxymethyltetrahydropyran, comprising hydrogenating in the presence of an effective amount of Raney nickel catalyst at a temperature of from about 90° C. to about 200° C. and at a hydrogen pressure in excess of about 1000 pounds per square inch, a crude mixture comprising the products of the hydration of acrolein in an aqueous medium containing sufficient acid to maintain the pH of the medium at from about 0.5 to about 7 and at a hydration temperature not greater than about 130° C.

3. A method of preparing saturated dihydric alcohols including 4-hydroxy-3-hydroxymethyltetrahydropyran, comprising hydrogenating in the presence of an effective amount of a hydrogenation catalyst at a temperature of from about 30° C. to about 200° C. and at a hydrogen pressure of from about 500 pounds per square inch to about 5000 pounds per square inch, a crude mixture comprising the products of the hydration of acrolein in an aqueous medium containing from about 0.1 to about 1.5 equivalents of sulfuric acid per liter and at a hydration temperature of from about 20° C. to about 50° C.

4. A process of preparing 4-hydroxy-3-hydroxymethyltetrahydropyran which comprises reacting acrolein with water in the presence of an acidic hydration catalyst and hydrogenating the products of hydration in the presence of an active hydrogenation catalyst by treatment with hydrogen at a temperature between about 50° C. and about 200° C. and under a hydrogen pressure of between about 500 pounds per square inch and about 5000 pounds per square inch.

5. A process of preparing a dihydric 4-hydroxy-3-hydroxymethyltetrahydropyran which comprises hydrating an alpha,beta olefinic aldehyde having a hydrogen atom attached to the alpha carbon atom by treatment with water in the presence of a strong mineral acid, and hydrogenating the products of hydration in the presence of an active nickel hydrogenation catalyst by treatment with hydrogen at a temperature between about 105° C. and about 200° C. and under a hydrogen pressure in excess of 1000 pounds per square inch.

6. A process of preparing a dihydric 4-hydroxy-3-hydroxy-methyltetrahydropyran which comprises reacting an alpha,beta olefinic aldehyde having a hydrogen atom attached to the alpha carbon atom with water in the presence of an acidic hydration catalyst, hydrogenating the products of hydration by treatment with molecular hydrogen under superatmospheric pressure in the presence of a hydrogenation catalyst, and recovering from the product of hydrogenation a hydroxy-hydroxymethyltetrahydropyran.

7. A process of preparing a dihydric 4-hydroxy-3-hydroxymethyltetrahydropyran which comprises reacting an alpha,beta olefinic aldehyde having a hydrogen atom attached to the alpha carbon atom with water in the presence of an acidic hydration catalyst, and hydrogenating the products of hydration.

8. A process of preparing saturated dihydric alcohols including 4-hydroxy-3-hydroxymethyltetrahydropyran, comprising hydrating acrolein by treatment at a temperature from about 20° C. to about 130° C. with an aqueous solution of a strong mineral acid, said solution having an acidity represented by a pH value from about 0.5 to about 2.5, and hydrogenating the products of the hydration by treatment with molecular hydrogen in the presence of a hydrogenation catalyst.

9. A process of preparing saturated dihydric alcohols including 4-hydroxy-3-hydroxymethyltetrahydropyran, comprising hydrating acrolein by treatment with water in the presence of an acidic hydration catalyst, and hydrogenating the products of the hydration by treatment with molecular hydrogen in the presence of a hydrogenation catalyst.

10. A process for the preparation of saturated dihydric alcohols including 4-hydroxy-3-hydroxymethyltetrahydropyran, which comprises hydrating acrolein by treatment with water having a pH value of from about 0.5 to 7 and hydrogenating by treatment with molecular hydrogen in the presence of a hydrogenation catalyst the crude products produced by the hydration reaction.

LEWIS F. HATCH.
THEODORE W. EVANS.

REFERENCES CITED

The following references are of record in the file of this patent:

UNITED STATES PATENTS

| Number | Name | Date |
|---|---|---|
| 2,134,430 | Goepp | Oct. 25, 1938 |
| 2,368,186 | Wickert | Jan. 30, 1945 |

OTHER REFERENCES

Alder et al.: Berichte, Jg. 74, No. 6/1941, page 923.